(12) United States Patent
Shinde et al.

(10) Patent No.: US 12,146,423 B2
(45) Date of Patent: Nov. 19, 2024

(54) COMPRESSOR BLEED PRESSURE RECOVERY

(71) Applicant: General Electric Company, Schenectady, NY (US)

(72) Inventors: Kudum Shinde, Bengaluru (IN); Yashpal Patel, Bengaluru (IN); Sesha Subramanian, Bengaluru (IN); Brandon C. Clarke, Milford, OH (US)

(73) Assignee: GENERAL ELECTRIC COMPANY, Evendale, OH (US)

( * ) Notice: Subject to any disclaimer, the term of this patent is extended or adjusted under 35 U.S.C. 154(b) by 0 days.

(21) Appl. No.: 18/152,904

(22) Filed: Jan. 11, 2023

(65) Prior Publication Data

US 2024/0229664 A1 Jul. 11, 2024

(51) Int. Cl.
*F01D 9/06* (2006.01)
*F01D 9/04* (2006.01)
*F02C 6/08* (2006.01)

(52) U.S. Cl.
CPC ............. *F01D 9/065* (2013.01); *F01D 9/041* (2013.01); *F02C 6/08* (2013.01); *F05D 2220/3218* (2013.01); *F05D 2240/121* (2013.01); *F05D 2240/122* (2013.01); *F05D 2260/606* (2013.01)

(58) Field of Classification Search
CPC . F01D 9/065; F01D 9/041; F02C 6/08; F05D 2220/3218; F05D 2240/121; F05D 2240/122; F05D 2260/606
See application file for complete search history.

(56) References Cited

U.S. PATENT DOCUMENTS

| | | | |
|---|---|---|---|
| 3,632,223 A | 1/1972 | Hampton | |
| 3,945,759 A | 3/1976 | Bobo | |
| 5,231,825 A | 8/1993 | Baughman et al. | |
| 6,438,941 B1 * | 8/2002 | Elliott | F02C 9/18 60/785 |
| 6,550,254 B2 | 4/2003 | Proctor et al. | |
| 6,634,595 B2 | 10/2003 | Koncsek et al. | |
| 6,783,324 B2 | 8/2004 | Muny | |
| 8,220,276 B2 | 7/2012 | Clemen et al. | |
| 8,388,308 B2 | 3/2013 | Karafillis et al. | |
| 9,322,337 B2 | 4/2016 | Little et al. | |

(Continued)

FOREIGN PATENT DOCUMENTS

DE 102019110834 A1 10/2020

*Primary Examiner* — Jacob M Amick
*Assistant Examiner* — Charles J Brauch
(74) *Attorney, Agent, or Firm* — Venable LLP; Edward A. Kmett; Michele V. Frank (57) ABSTRACT

A gas turbine engine includes a compressor section having rotor shaft assembly and a stator shroud assembly including a stator shroud casing surrounding the compressor rotor shaft assembly, a compressor flow passage being defined between the compressor rotor shaft assembly and the stator shroud casing. A compressor bleed air system includes a compressor bleed air duct that includes a sloped inlet portion, such as a NACA submerged inlet portion, in the stator shroud casing. Alternatively, stator vanes at a compressor bleed air passage may have a NACA inlet scoop and an airflow passage through the stator vane providing a bleed airflow to a cavity, which has airflow passages providing bleed air to an upstream side of the bleed air passage.

19 Claims, 6 Drawing Sheets

(56) References Cited

U.S. PATENT DOCUMENTS

| | | |
|---|---|---|
| 10,125,781 B2 | 11/2018 | Klasing et al. |
| 10,174,681 B2 | 1/2019 | Beecroft |
| 10,451,084 B2 | 10/2019 | Subramanian et al. |
| 10,934,943 B2 | 3/2021 | Taylor et al. |
| 11,300,002 B2 | 4/2022 | Sidorovich Paradiso et al. |
| 2020/0386109 A1 | 12/2020 | Becker |

* cited by examiner

COMPRESSOR BLEED PRESSURE RECOVERY

TECHNICAL FIELD

The present disclosure relates to a compressor bleed air system for a gas turbine engine.

BACKGROUND

Conventionally, a gas turbine engine may include a compressor that compresses an inlet airflow flowing through an inlet to the compressor to generate compressed air that is generally provided to a combustor where it is utilized in combustion within the gas turbine engine. The gas turbine engine may also include a compressor bleed air system in which a portion of the compressed air flowing through the compressor is rerouted out of the compressor upstream of the combustor to be utilized for purposes other than combustion. Such other uses may include, for example, a cooling airflow provided to various components of the gas turbine engine, such as a turbine section of the gas turbine engine, or for environmental purposes such as cabin pressurization and temperature control.

BRIEF DESCRIPTION OF THE DRAWINGS

Features and advantages of the present disclosure will be apparent from the following description of various exemplary embodiments, as illustrated in the accompanying drawings, wherein like reference numbers generally indicate identical, functionally similar, and/or structurally similar elements.

DETAILED DESCRIPTION

Features, advantages, and embodiments of the present disclosure are set forth or apparent from a consideration of the following detailed description, drawings, and claims. Moreover, it is to be understood that the following detailed description is exemplary and intended to provide further explanation without limiting the scope of the disclosure as claimed.

Various embodiments are discussed in detail below. While specific embodiments are discussed, this is done for illustration purposes only. A person skilled in the relevant art will recognize that other components and configurations may be used without departing from the spirit and the scope of the present disclosure.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

Conventionally, a gas turbine engine may include a compressor that compresses an inlet airflow flowing through an inlet to the compressor to generate compressed air that is generally provided to a combustor where it is utilized in combustion within the gas turbine engine. The gas turbine engine may also include a compressor bleed air system in which a portion of the compressed air flowing through the compressor is rerouted out of the compressor upstream of the combustor to be utilized for purposes other than combustion. Such other uses may include, for example, a cooling airflow provided to various components of the gas turbine engine, such as a turbine section of the gas turbine engine, or for environmental purposes such as cabin pressurization and temperature control. The compressor bleed air system may generally include an inlet through a compressor stator shroud through which the compressor bleed air flows into a bleed air system duct. The inlet redirects a portion of the compressed air flowing axially through the compressor to flow radially into the bleed air system duct and into a bleed air system pressurized cavity. Thus, the inlet, in a cross-sectional view, may generally define an elbow that redirects the flow approximately ninety degrees. The elbow of the inlet may generally result in a pressure loss of the bleed air flow on an upstream side of the inlet due to flow separation of the bleed air from the upstream surface of the inlet.

The present disclosure addresses the foregoing by providing techniques to reduce the flow separation and to recover some of the pressure loss at the upstream side of the inlet. In one aspect, a sloped upstream portion to the inlet is included so as to gradually turn the flow of the bleed air within the inlet, thereby reducing the separation of the flow on the upstream side of the inlet. The sloped upstream portion may include, for example, a plurality of NACA submerged inlets that may be provided between stator vanes on a stator shroud and that extend into the inlet. Thus, the NACA submerged inlets may provide for better transitional flow of the bleed air into the inlet so as to reduce the flow separation. In another aspect, the stator vanes may include a flow passage therewithin that provides a flow of the compressed air through the stator vane to a cavity defined by the stator shroud. The cavity includes a plurality of apertures therethrough to provide airflow from the cavity to the upstream side of the inlet where the flow separation may occur. As a result, pressure recovery may be obtained by filling in the separation flow area with the airflow from the cavity.

Figure 1:
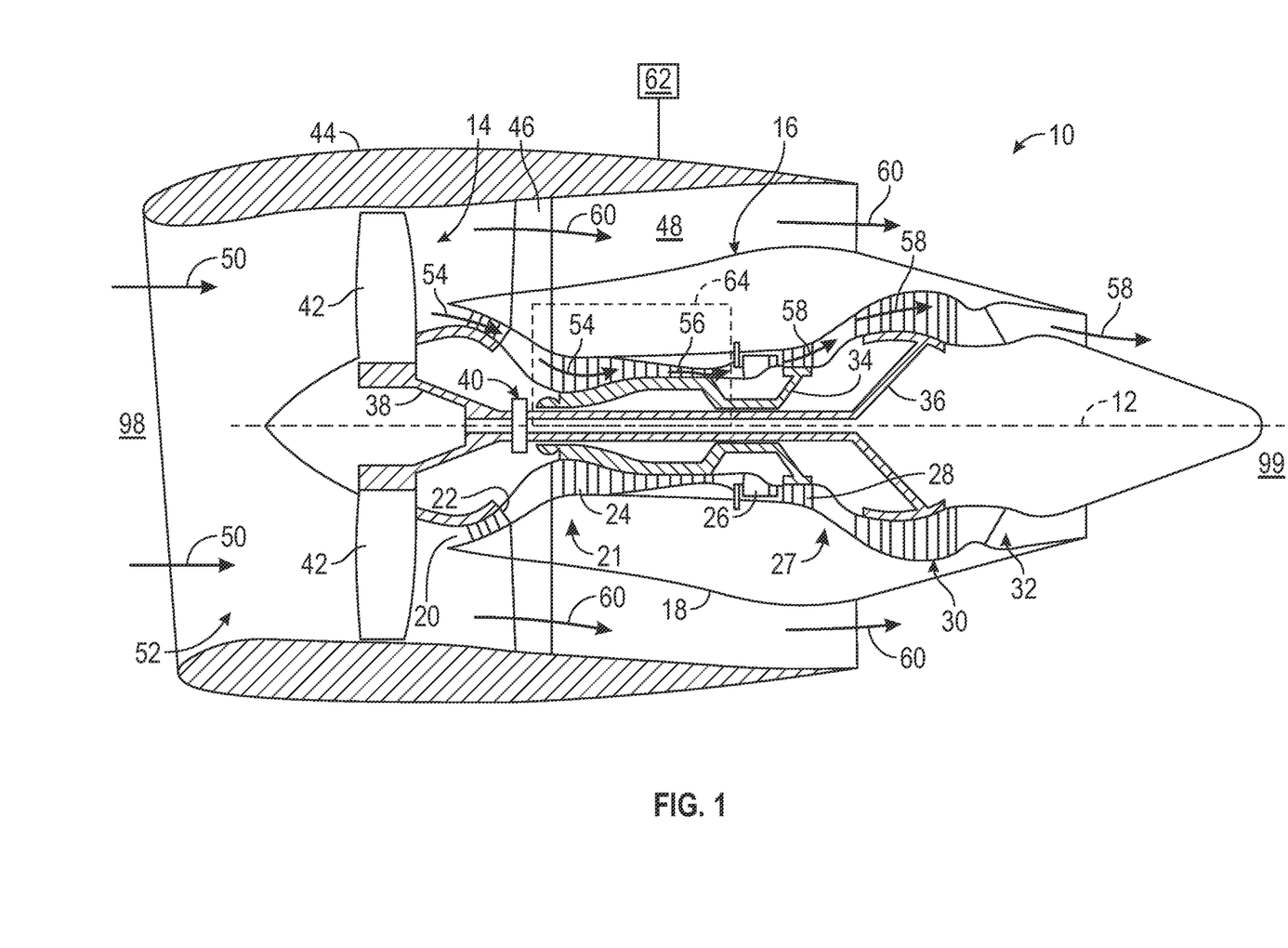
FIG. 1 is a schematic partial cross-sectional side view of an exemplary high bypass turbofan jet engine, according to an aspect of the present disclosure.

Referring now to the drawings, FIG. 1 is a schematic partial cross-sectional side view of an exemplary high by-pass turbofan jet engine 10, herein referred to as "engine 10," as may incorporate various embodiments of the present disclosure. Although further described below with reference to a turbofan engine, the present disclosure is also applicable to turbomachinery in general, including turbojet, turboprop, and turboshaft gas turbine engines, including marine and industrial turbine engines, and auxiliary power units. As shown in FIG. 1, engine 10 has a longitudinal centerline axis 12 that extends therethrough from an upstream end 98 of the engine 10 to a downstream end 99 of the engine 10 for reference purposes. In general, engine 10 may include a fan assembly 14 and a core engine 16 disposed downstream from the fan assembly 14.

The core engine 16 may generally include a core engine outer casing 18 that defines an annular inlet 20 about the longitudinal centerline axis 12. The core engine outer casing 18 encases, in serial flow relationship, a compressor section 21 having a booster or a low pressure (LP) compressor 22 and a high pressure (HP) compressor 24, a combustor 26, a turbine section 27 including a high pressure (HP) turbine 28 and a low pressure (LP) turbine 30, and a jet exhaust nozzle section 32. A high pressure (HP) rotor shaft 34 drivingly connects the HP turbine 28 to the HP compressor 24, thereby together forming a high pressure spool. A low pressure (LP) rotor shaft 36 drivingly connects the LP turbine 30 to the LP compressor 22, thereby together defining a low pressure spool. The LP rotor shaft 36 may also be connected to a fan shaft 38 of the fan assembly 14. In particular embodiments, as shown in FIG. 1, the LP rotor shaft 36 may be connected to the fan shaft 38 by way of a reduction gear 40, such as in an indirect-drive configuration or a geared-drive configuration. In other embodiments, although not illustrated, the engine 10 may further include an intermediate pressure (IP) compressor and a turbine rotatable with an intermediate pressure compressor.

As shown in FIG. 1, the fan assembly 14 includes a plurality of fan blades 42 that are coupled to, and extend radially outwardly from, the fan shaft 38. An annular fan casing or a nacelle 44 circumferentially surrounds the fan assembly 14 and/or at least a portion of the core engine 16. The nacelle 44 may be supported relative to the core engine 16 by a plurality of circumferentially spaced outlet guide vanes or struts 46. Moreover, at least a portion of the nacelle 44 may extend over an outer portion of the core engine 16 so as to define a bypass airflow passage 48 therebetween.

In operation, air 50 enters the nacelle 44 at a nacelle inlet 52, and a portion of the air 50 enters the compressor section 21 as a compressor inlet air flow 54, where it is compressed to generate compressed air 56. Another portion of the air 50 enters the bypass airflow passage 48, thereby providing a bypass airflow 60. The compressed air 56 from the HP compressor 24 enters the combustor 26, where the compressed air 56 is mixed with fuel that is then ignited and burned to generate combustion gases 58. The combustion gases 58 pass through the HP turbine 28 and then through the LP turbine 30, thereby driving the HP compressor 24 and the LP compressor 22. Finally, the combustion gases 58 pass through the jet exhaust nozzle section 32 to provide thrust.

Operation of the engine 10 may be controlled in whole or in part by an electronic engine controller, shown schematically at 62. One example of such a controller 62 is a full authority digital engine control ("FADEC"). The controller 62 may be mounted in any convenient location or in the engine 10, including, but not limited to, within a fan nacelle, or within the core engine 16.

Figure 2:
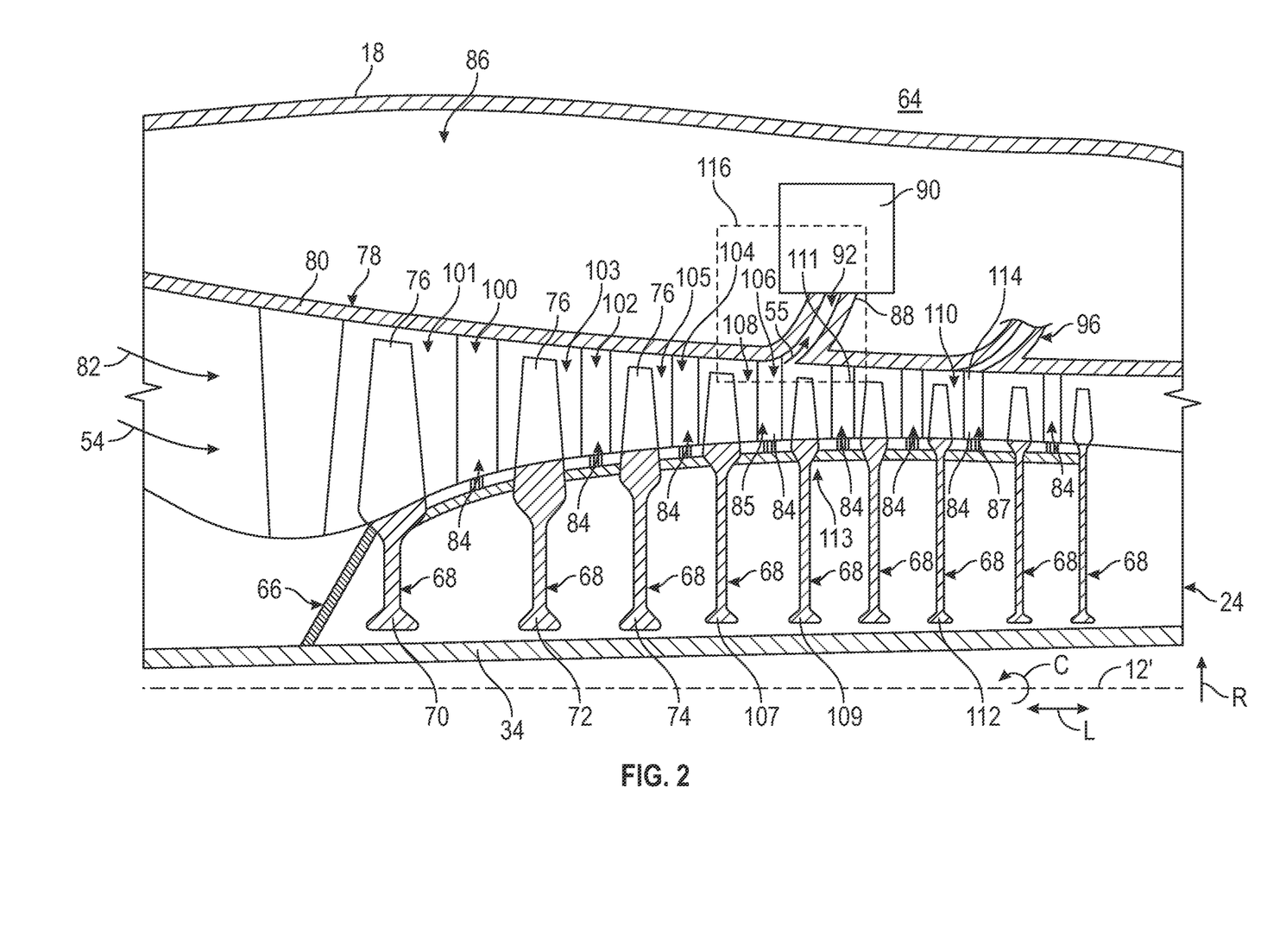
FIG. 2 is a partial cross-sectional side view of the high pressure compressor, taken at detail view 64 at of FIG. 1, according to an aspect of the present disclosure.

FIG. 2 is a partial cross-sectional side view of the high pressure compressor 24, taken at detail view 64 at of FIG. 1, according to an aspect of the present disclosure. In FIG. 2, the engine 10 includes the high pressure compressor 24, which, as described above, may be part of the compressor section 21 (FIG. 1). The compressor section 21 may define a compressor centerline axis 12', which may correspond to the engine longitudinal centerline axis 12. The high pressure compressor 24 includes a compressor rotor shaft assembly 66 that may incorporate the HP rotor shaft 34, and a plurality of compressor rotors 68, including a first compressor rotor 70, a second compressor rotor 72, and a third compressor rotor 74. In FIG. 2, only three compressor rotors are labeled, but as can readily be seen in FIG. 2, as many as ten compressor rotors (or more) may be provided in the compressor rotor shaft assembly 66. The compressor rotors 68 are longitudinally spaced apart from each other in a longitudinal direction (L) along the compressor centerline axis 12'. Each compressor rotor 68 of the plurality of compressor rotors 68 has a plurality of compressor rotor vanes 76 extending radially outward therefrom in a radial direction (R) with respect to the compressor centerline axis 12'. While only one compressor rotor vane 76 is shown in FIG. 2 for each compressor rotor 68, a plurality of compressor rotor vanes 76 are circumferentially spaced about the compressor rotor 68.

The compressor section 21 is further seen to include a stator shroud assembly 78 that includes a stator shroud casing 80 that extends circumferentially about the compressor centerline axis 12' and that surrounds the compressor rotor shaft assembly 66. A compressor flow passage 82 is defined between the compressor rotor shaft assembly 66 and the stator shroud casing 80. In the exemplary compressor section 21 of FIG. 2, an axial flow compressor is depicted in which the compressor inlet air flow 54 generally flows through the compressor section 21 in the longitudinal (axial) direction (L) with respect to the compressor centerline axis 12'. The stator shroud assembly 78 further includes a plurality of stator vanes 84 that extend radially inward from the stator shroud casing 80. The plurality of stator vanes 84, similar to the compressor rotor vanes 76, are circumferentially spaced apart from one another about the stator shroud casing 80. Together, a respective compressor rotor 68 and a circumferential row of the stator vanes 84 may be considered to be a compressor stage. For example, the first compressor rotor 70 and a first circumferential row 100 of the stator vanes 84 may be considered to be a first compressor stage 101, the second compressor rotor 72 and a second circumferential row 102 of the stator vanes 84 may be considered to be a second compressor stage 103, the third compressor rotor 74 and a third circumferential row 104 of the stator vanes 84 may be considered to be a third compressor stage 105, a fourth compressor rotor 107 and a fourth circumferential row 106 of the stator vanes 84 may be considered to be a fourth compressor stage 108, and a fifth compressor rotor 109 and a fifth circumferential row 111 of stator vanes 84 may be considered to be a fifth compressor stage 113. Of course, further compressor rotors 68 and a corresponding circumferential row of stator vanes 84 can be considered to be further compressor stages.

The core engine outer casing 18 (see also, FIG. 1), as it relates to the compressor section 21, is arranged radially outward of the stator shroud casing 80 and defines an underspace 86 between the core engine outer casing 18 and the stator shroud casing 80. Provided within the underspace 86 may be a compressor bleed air system 88. More specifically, the compressor bleed air system 88 may include a compressor bleed air cavity 90 downstream of a compressor bleed air passage 92, where the compressor bleed air passage 92 provides airflow communication between the compressor flow passage 82 and the compressor bleed air cavity 90. The compressor bleed air system 88 provides a flow of compressor bleed air 55 from the high pressure compressor 24 for use in, for example, an aircraft environmental control system, for providing cooling to various portions of the engine 10, or for other purposes. In FIG. 2, the compressor bleed air system 88 is shown as being arranged at the fourth compressor stage 108, and the stator vanes 84 arranged in the fourth circumferential row 106 at the fourth compressor stage 108 may be referred to as bleed section stator vanes 85 due to their proximity to the compressor bleed air passage 92. A second compressor bleed air system 96, which may be similar to the compressor bleed air system 88, may also be included within the compressor section 21, and may be arranged downstream of the compressor bleed air system 88. For example, the second compressor bleed air system 96 may be arranged at a seventh compressor stage 110 defined by a seventh compressor rotor 112 and a seventh circumferential row 114 of stator vanes 84, where the stator vanes 84 in the seventh circumferential row 114 may be referred to as second bleed section stator vanes 87. Thus, the description of the bleed air system 88 below may also be applicable to the second compressor bleed air system 96 and common elements between the bleed air system 88 and the second compressor bleed air system 96 may be designated with a "prime" designation for the second compressor bleed air system 96.

Figure 3:
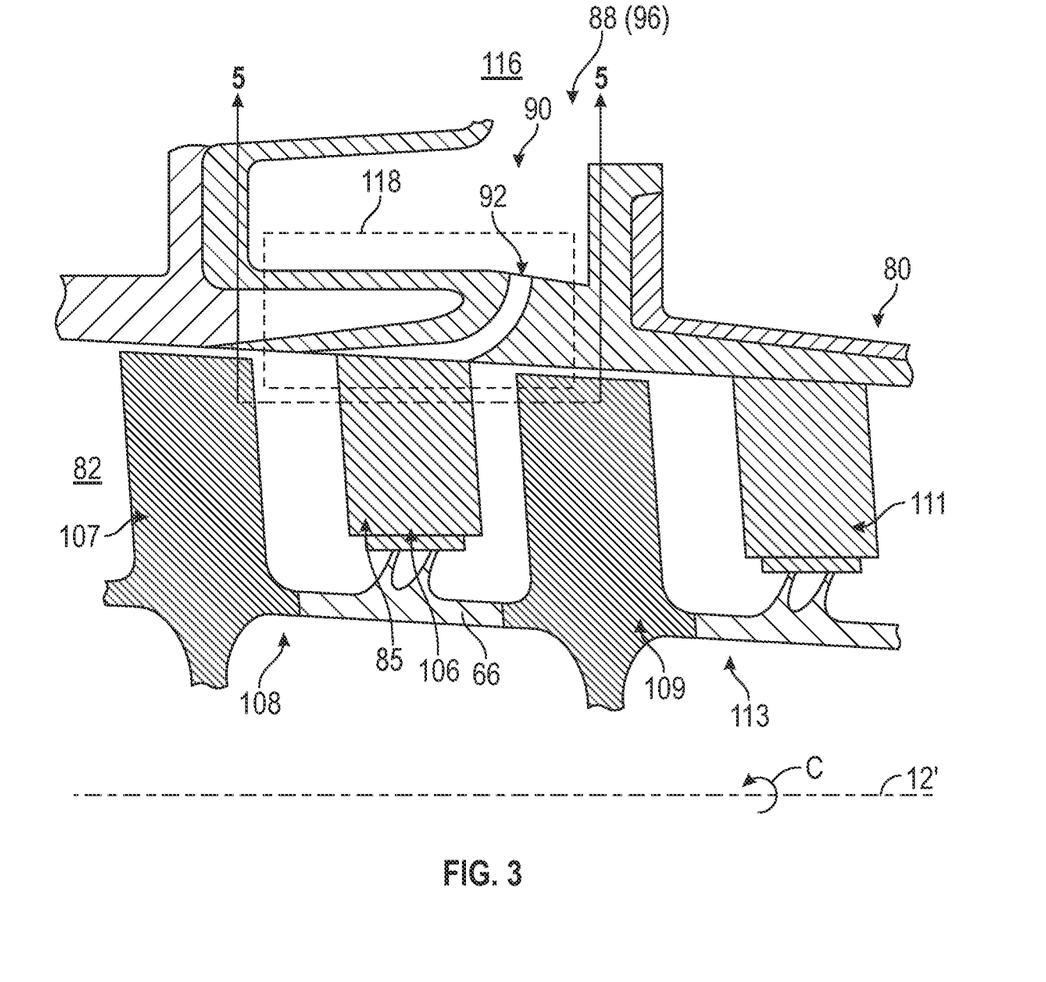
FIG. 3 is an enlarged partial cross-sectional view of the compressor bleed air system, taken at detail view 116 of FIG. 2, according to an aspect of the present disclosure.
Figure 4:
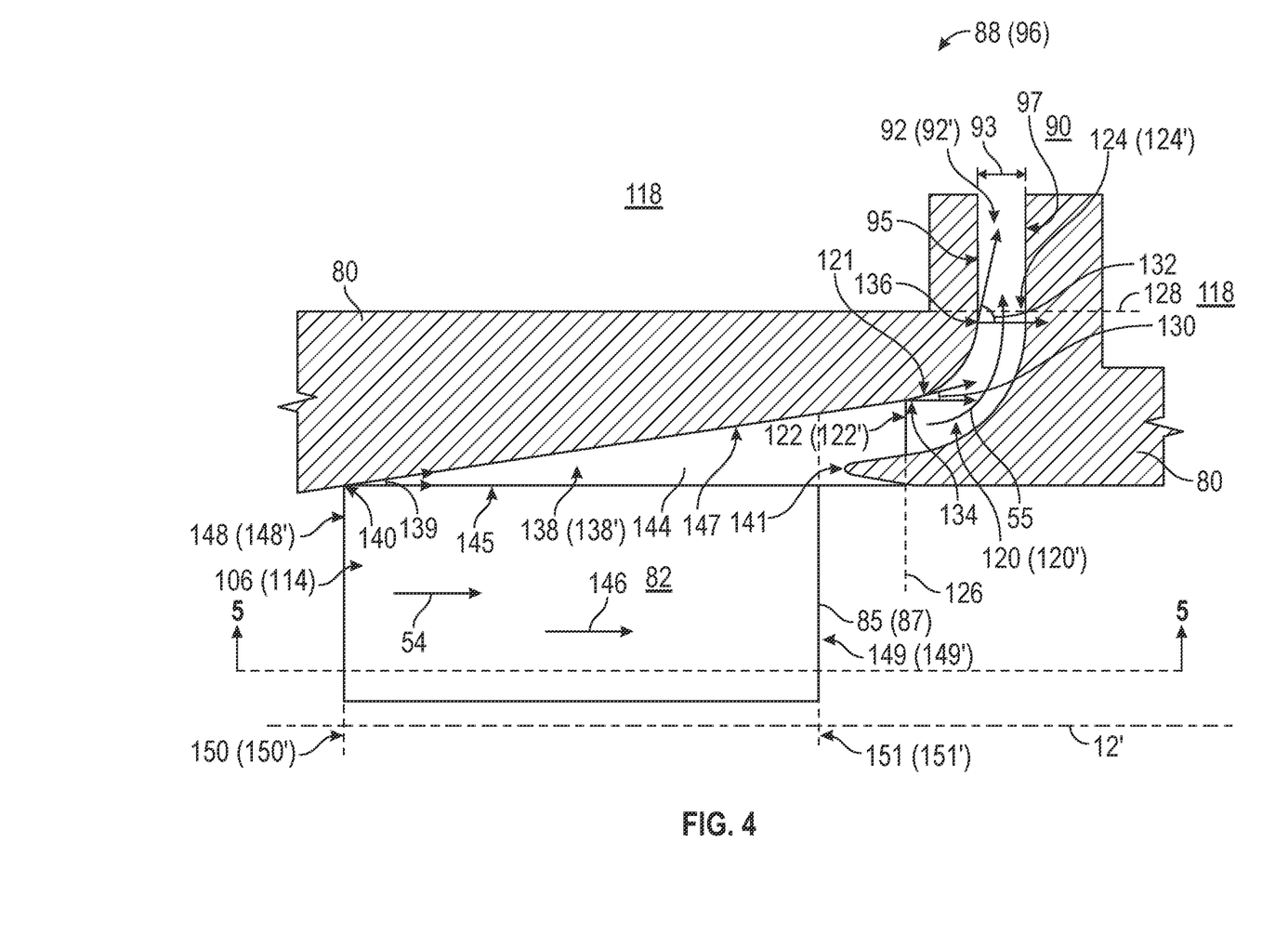
FIG. 4 is an enlarged view of the compressor bleed air system, taken at detail view 118 of FIG. 3, according to an aspect of the present disclosure.

FIG. 3 is an enlarged partial cross-sectional view of the compressor bleed air system 88, taken at detail view 116 of FIG. 2, according to an aspect of the present disclosure. FIG. 4 is an enlarged view of the compressor bleed air system 88 taken at detail view 118 of FIG. 3. As stated above, the aspect of FIG. 4 may also be applicable to the second compressor bleed air system 96 and, therefore, some elements shown in FIG. 4 include reference numerals that are applicable to the second compressor bleed air system 96. Referring collectively to FIGS. 3 and 4, the compressor bleed air system 88 includes the compressor bleed air passage 92, which may include a bleed air duct 120. The bleed air passage 92 may have a width 93 between an upstream side 95 of the bleed air passage 92 and a downstream side 97 of the bleed air passage 92. The bleed air duct 120 extends through the stator shroud casing 80 and provides airflow communication between the compressor flow passage 82 and the compressor bleed air cavity 90. The bleed air duct 120 may generally define a curved inlet that includes an inlet end 122 and an outlet end 124. The bleed air passage 92 may extend beyond the outlet end 124 of the bleed air duct 120 to connect with the bleed air cavity 90. A splitter 141 may be arranged at an inner side of the inlet end 122 of the bleed air duct 120 and extend upstream from the inlet end 122 into a sloped inlet portion 138 (described below). The splitter 141 may function to split the air flow 54 flowing through the compressor flow passage 82 to provide the compressor bleed air 55 to the bleed air duct 120. In one aspect, an upstream side 134 of the inlet end 122 may be arranged at a first angle 130 with respect to the compressor centerline axis 12', and an upstream side 136 of the outlet end 124 may be arranged at a second angle 132. In another aspect, the inlet end 122 may be aligned with a plane 126 to be generally perpendicular to the compressor centerline axis 12', and the outlet end 124 may be aligned with a plane 128 to be generally parallel to the compressor centerline axis 12'. Thus, the bleed air duct 120 may be a curved duct (e.g., defining a ninety-degree curve or elbow) so as to direct the flow of bleed air 55 from being a generally axial flow (i.e., the air flow 54 flowing generally parallel with the compressor centerline axis 12' through the compressor flow passage 82) to being a generally radial airflow that flows outward from the compressor centerline axis 12' into the compressor bleed air cavity 90.

The bleed air system 88 further includes a sloped inlet portion 138 in the stator shroud casing 80 that extends upstream from the inlet end 122 of the bleed air duct 120 to at least a leading edge plane 150. The leading edge plane 150 may be defined by a leading edge 148 of at least one of the plurality of bleed section stator vanes 85. While it may be possible that the leading edges 148 of each of the bleed section stator vanes 85 align longitudinally with the leading edge plane 150, due to manufacturing tolerances, respective ones of the bleed section stator vanes 85 may be slightly forward or slight aft of the leading edge plane 150. Thus, the leading edge plane 150 may be defined by the leading edge 148 of any one or more of the bleed section stator vanes 85, or may be defined by an average longitudinal location of the leading edges 148 of the respective bleed section stator vanes 85. The sloped inlet portion 138 expands radially outward in the stator shroud casing 80 from an upstream end 140 of the sloped inlet portion 138 to the inlet end 122 of the bleed air duct 120. The sloped inlet portion 138 may be arranged at a slope angle 139, which may have a range from five degrees to fifteen degrees, for example. Of course, the slope angle 139 is not limited to the foregoing range and other angles may be implemented instead, based on flow conditions of the bleed air 55. The slope angle 139 may be a generally acute angle so as to provide for a more gradual angular transition of the bleed air 55 in flowing from the axial flow 54 to the radial flow, thereby reducing flow separation that my occur along an upstream side 121 of the bleed air duct 120 between the inlet end 122 and the outlet end 124. By reducing the flow separation along the upstream side 121, pressure losses that may otherwise occur in the bleed air 55 flowing into the compressor bleed air cavity 90 due to, for example, flow separation, may be reduced, thereby providing for a higher pressure within the bleed air cavity 90. In one aspect, the sloped inlet portion 138 may extend circumferentially about the compressor centerline axis 12', and, as shown in FIG. 3, the bleed section stator vanes 85, which are circumferentially spaced apart, my extend from the stator shroud casing 80 through the sloped inlet portion 138 (shown as the trailing edge 149 in dashed lines extending through the sloped inlet portion 138).

Figure 5:
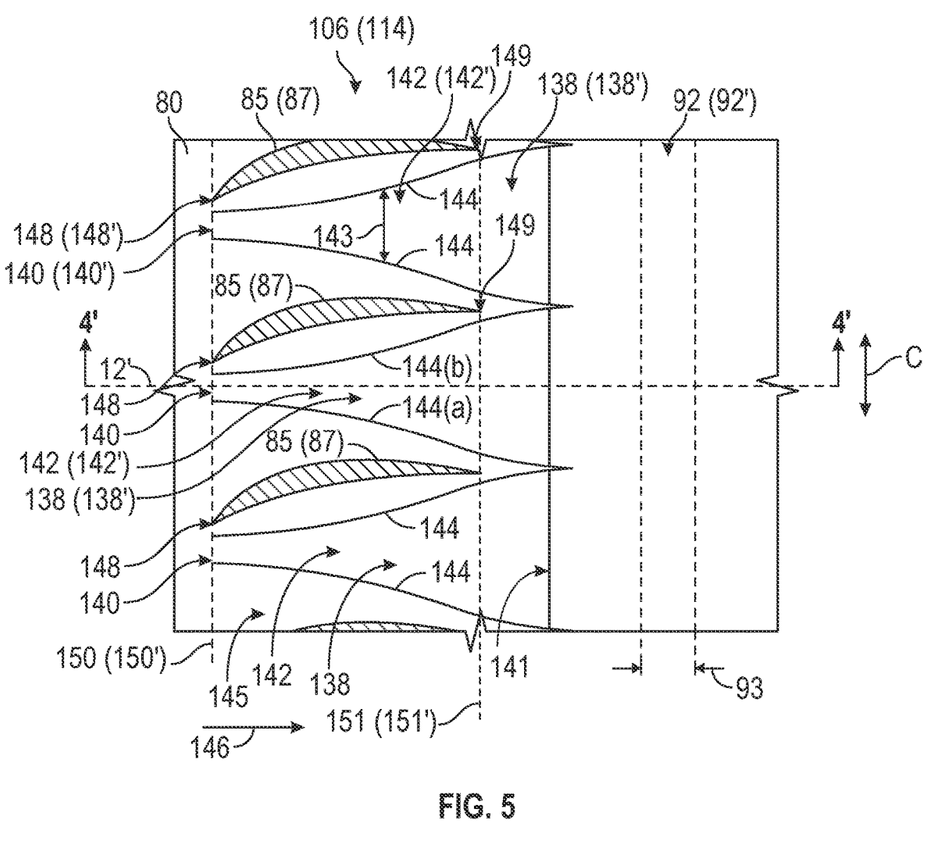
FIG. 5 is a partial circumferential cross-sectional view of a compressor bleed air system 88, taken at plane 5-5 of FIG. 4, according to an aspect of the present disclosure.

FIG. 5 is a partial circumferential cross-sectional view of a compressor bleed air system 88, taken at plane 5-5 of FIG. 4, according to an aspect of the present disclosure. In FIG. 5, the bleed section stator vanes 85 are depicted as being spaced apart in the circumferential direction C. In addition, the sloped inlet portion 138 in the FIG. 5 aspect constitutes a plurality of NACA submerged inlet portions 142, where each one of the NACA submerged inlet portions 142 is circumferentially arranged between a respective pair of the plurality of bleed section stator vanes 85. Each NACA submerged inlet portion 142 includes sidewalls 144, including, for example, a first sidewall 144(a) and a second sidewall 144(b) that, as shown in FIG. 5, have a diverging width 143 in a generally wishbone-type shape in the circumferential direction and in a downstream direction 146 from the upstream end 140 of the NACA submerged inlet portion 142 to the inlet end 122 of the bleed air duct 120. The sidewalls 144 may generally extend from an inner surface 145 (FIG. 4) of the stator shroud casing 80 to a sloped surface 147 (FIG. 4) of the NACA submerged inlet portion 142. In one aspect, the upstream end 140 of each NACA submerged inlet portion 142 may be generally longitudinally aligned with a leading edge plane 150. For example, the leading edge plane 150 may define a location of a leading edge 148 of at least one of the bleed section stator vanes 85, and the upstream end 140 of each NACA submerged inlet portion 142 may be aligned with the leading edge plane 150. Of course, the upstream end 140 need not be aligned with the leading edge 148 of all of the bleed section stator vanes 85, and, may be arranged slightly upstream of the leading edge plane 150 or slightly downstream of the leading edge plane 150, due to manufacturing inaccuracies/tolerances. The bleed section stator vanes 85 may also include a trailing edge 149, and a trailing edge plane 151 may be defined by the trailing edge 149 of at least one of the bleed section stator vanes 85. As shown in FIG. 4, the bleed air duct 120 may be arranged downstream of the trailing edge plane 151. For reference purposes, a plane 4'-4' is shown in FIG. 5, and the cross-sectional view of FIG. 4 may be applicable at the plane 4'-4' to define the geometry of each NACA submerged inlet portion 142. Thus, in the same manner as described above, the NACA submerged inlet portions 142 may provide for a more gradual angular transition of the bleed air 55 in flowing from the axial flow 54 to the radial flow, thereby reducing flow separation that may occur along an upstream side 121 of the bleed air duct 120 between the inlet end 122 and the outlet end 124. By reducing the flow separation along the upstream side 121, pressure losses that may otherwise occur in the bleed air 55 flowing into the compressor bleed air cavity 90 may be reduced, thereby providing for a higher pressure within the bleed air cavity 90.

As was briefly discussed above, the compressor section 21 may include a second compressor bleed air system 96, which may be similar to the bleed air system 88, arranged downstream of the bleed air system 88. Referring to FIGS. 4 and 5, the second compressor bleed air system 96 includes a plurality of second bleed section stator vanes 87 extending from the stator shroud casing 80 into the compressor flow passage 82. A second leading edge plane 150' is defined perpendicular to the compressor centerline axis 12' at a leading edge 148' of at least one of the plurality of the second bleed section stator vanes 87. A second compressor bleed air duct 120' includes an inlet end 122' and an outlet end 124', where the inlet end 122' extends through the stator shroud casing 80 and provides airflow communication between the compressor flow passage 82 and the second compressor bleed air duct 120'. A second sloped inlet portion 138' in the stator shroud casing 80 extends upstream from the inlet end 122' of the second compressor bleed air duct 120' to at least the second leading edge plane 150'. The second sloped inlet portion 138' expands radially outward in the stator shroud casing 80 from an upstream end 140' of the second sloped inlet portion 138' to the inlet end 122' of the second compressor bleed air duct 120'. The inlet end 122' of the second compressor bleed air duct 120' is arranged downstream of a trailing edge plane 151' defined by a trailing edge 149 of at least one of the plurality of second bleed section stator vanes 87. In the same manner as described above for the bleed air system 88, the second compressor bleed air system 96 may include the second plurality of NACA submerged inlet portions 142' having the arrangement similar to that shown in FIG. 5. Thus, the elements of the NACA submerged inlet portions 142 described with regard to FIG. 5 are also applicable to the second plurality of NACA submerged inlet portions 142' and the description of those elements will not be repeated herein.

Figure 6:
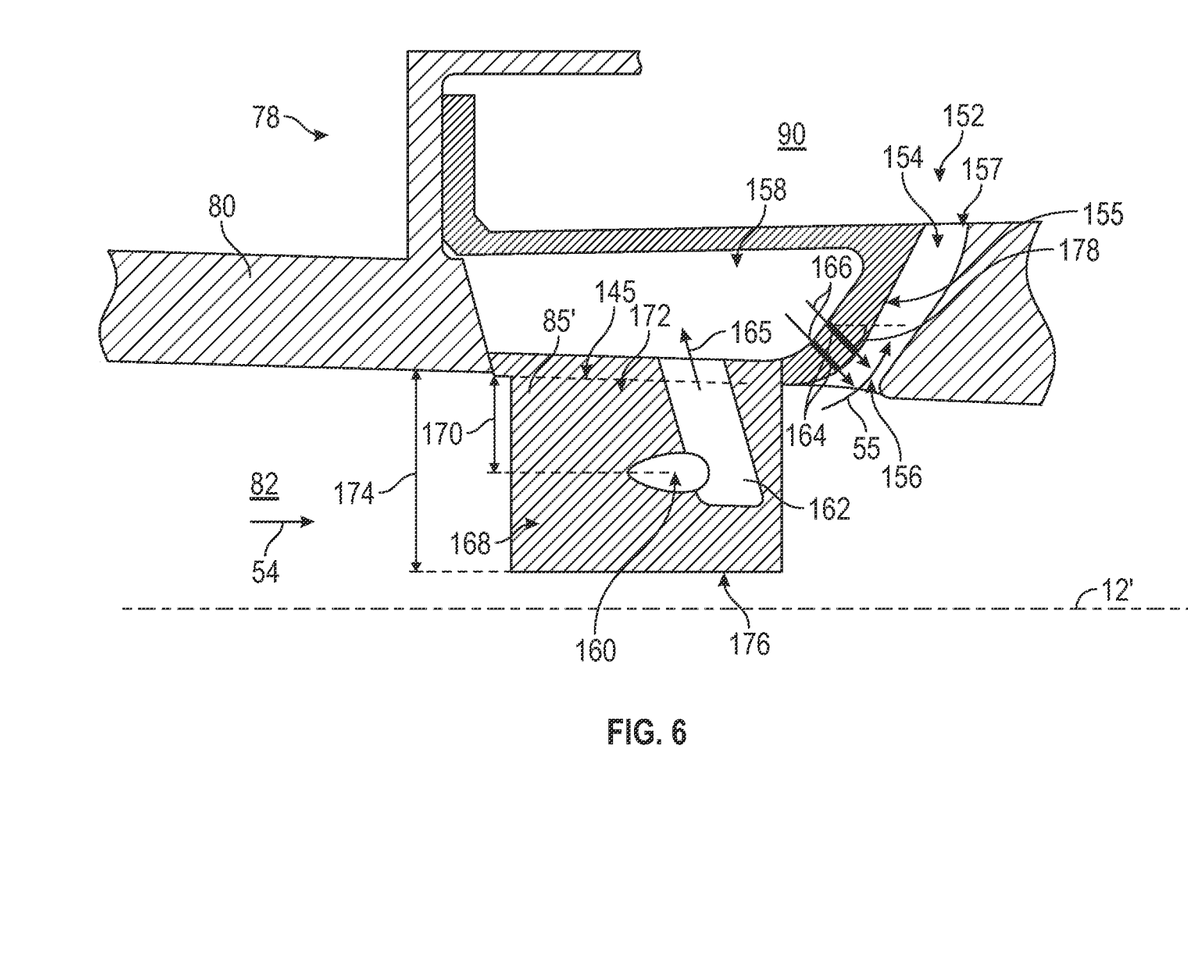
FIG. 6 is a partial cross-sectional view of an alternate bleed air system to that shown in FIG. 3, according to an aspect of the present disclosure.

FIG. 6 is a partial cross-sectional view of an alternate bleed air system 152 to that shown in FIG. 3, according to another aspect of the present disclosure. In the FIG. 6 aspect, the bleed air system 152 includes a bleed air passage 154 that includes an inlet end 156 through the stator shroud casing 80 to provide airflow communication between the compressor flow passage 82 and the bleed air passage 154, and an outlet end 157 that provides airflow communication to the bleed air cavity 90. The stator shroud assembly 78 defines a stator bleed air cavity 158 arranged radially outward of the stator shroud casing 80 and arranged upstream of the compressor bleed air passage 154. Similar to the FIG. 3 aspect, a plurality of bleed section stator vanes 85' extend into the compressor flow passage 82 and are circumferentially spaced about the stator shroud casing 80. In the FIG. 6 aspect, at least one of the plurality of bleed section stator vanes 85' includes a stator bleed airflow passage 162 providing airflow communication of a bleed air 165 between the compressor flow passage 82 and the stator bleed air cavity 158. The stator bleed airflow passage 162 includes an NACA inlet scoop 160 extending through a side portion 168 of the bleed section stator vane 85' and being in airflow communication with the stator bleed airflow passage 162. The NACA inlet scoop 160 may be arranged at a first distance 170 from an outer end 172 of the bleed section stator vane 85'. In one aspect, the first distance 170 may be a percentage of a span 174 of the bleed section stator vane 85' from the outer end 172 to an inner end 176 of the bleed section stator vane 84. For example, the percentage may be within a range from twenty-five percent of the span 174 of the bleed section stator vane 85' to fifty percent of the span 174 of the bleed section stator vane 85'.

The stator bleed air cavity 158 in FIG. 6 further includes at least one cavity airflow passage 164 that provides airflow communication of a bleed air 166 between the stator bleed air cavity 158 and the bleed air passage 154. Each of the cavity airflow passages 164 may have a length L and a diameter D, and a ratio L/D may be in a range from one to five (L/D=1.0 to 5.0). The foregoing ratio may provide for a sufficient amount of airflow to flow through the cavity airflow passages 164 to the bleed air passage 154 so as to reduce the flow separation near the inlet end 156 of the bleed air passage 154. In addition, the cavity airflow passages 164 may be arranged at an angle 178 with respect to the compressor centerline axis 12'. The cavity airflow passages 164 may be arranged on an upstream side 155 of the bleed air passage 154 in an area of the bleed air passage 154 in which the flow separation of the bleed air 55 may occur (e.g., near the inlet end 156, i.e., in an area on the upstream side of the bleed air passage 154 where flow separation may be likely to occur), thereby filling-in the flow separation area with the bleed air 166 so as to reduce pressure losses within the bleed air passage 154.

With the foregoing aspects, the present disclosure provides techniques for recovering pressure losses that may otherwise occur within the bleed air system of the compressor section. The aspects of FIG. 3 to FIG. 5 provide for reducing the flow separation at the bleed air inlet by providing a more gradual inclination and transition of the bleed air flow through the bleed air system. On the other hand, the FIG. 6 aspect provides a technique to fill-in the area of flow separation with bleed air provided through the stator vanes into the stator vane bleed air cavity.

While the foregoing description relates generally to a gas turbine engine, the gas turbine engine may be implemented in various environments. For example, the engine may be implemented in an aircraft, but may also be implemented in non-aircraft applications, such as power generating stations, marine applications, or oil and gas production applications. Thus, the present disclosure is not limited to use in aircraft.

Further aspects of the present disclosure are provided by the subject matter of the following clauses.

A gas turbine engine comprises a compressor section including (a) a compressor rotor shaft assembly, (b) a stator shroud casing surrounding the compressor rotor shaft assembly, a compressor flow passage being defined between the compressor rotor shaft assembly and the stator shroud casing, and (c) a plurality of bleed section stator vanes extending from the stator shroud casing into the compressor flow passage, a leading edge plane being defined perpendicular to a compressor centerline axis at a leading edge of at least one of the plurality of bleed section stator vanes, and a compressor bleed air system including (a) a compressor bleed air duct including an inlet end and an outlet end, the inlet end extending through the stator shroud casing and providing airflow communication between the compressor flow passage and the compressor bleed air duct, and (b) a sloped inlet portion in the stator shroud casing extending upstream from the inlet end of the compressor bleed air duct to at least the leading edge plane, the sloped inlet portion expanding radially outward in the stator shroud casing from an upstream end of the sloped inlet portion to the inlet end of the compressor bleed air duct, the inlet end of the compressor bleed air duct being arranged downstream of the plurality of bleed section stator vanes.

The gas turbine engine according to the preceding clause, wherein a trailing edge plane being defined at a trailing edge of at least one of the bleed section stator vanes, and the inlet end of the compressor bleed air duct is arranged downstream of the trailing edge plane.

The gas turbine engine according to any preceding clause, wherein the compressor section defining a compressor centerline axis, and the sloped inlet portion extends circumferentially about compressor centerline axis in the stator shroud casing.

The gas turbine engine according to any preceding clause, wherein the inlet end of the compressor bleed air duct comprises a curved duct having the inlet end and the outlet end, an upstream side of the inlet end of the curved duct being arranged at a first angle with respect the compressor centerline axis, and an upstream side of the outlet end of the curved duct being arranged at a second angle with respect to the compressor centerline axis.

The gas turbine engine according to any preceding clause, wherein the sloped inlet portion being arranged at a third angle with respect to the compressor centerline axis.

The gas turbine engine according to any preceding clause, wherein the sloped inlet portion comprising a plurality of NACA submerged inlet portions.

The gas turbine engine according to any preceding clause, wherein the plurality of bleed section stator vanes being circumferentially spaced about the stator shroud casing, and respective ones of the plurality of NACA submerged inlet portions are circumferentially arranged between a respective pair of the plurality of bleed section stator vanes.

The gas turbine engine according to any preceding clause, wherein each NACA submerged inlet portion including a first end being the upstream end of the sloped inlet portion, the first end being longitudinally aligned with the leading edge plane.

The gas turbine engine according to any preceding clause, wherein each NACA submerged inlet portion having a diverging width extending in a downstream direction from the first end of the NACA submerged inlet portion.

The gas turbine engine according to any preceding clause, wherein each NACA submerged inlet portion including a first sidewall and a second sidewall, the first sidewall and the second sidewall defining a wishbone shape in a plan view of the NACA submerged inlet portion.

The gas turbine engine according to any preceding clause, the compressor bleed air system being arranged at a first stage of the compressor section, and the gas turbine engine further includes a second stage of the compressor section downstream of the first stage, the second stage including (i) a plurality of second bleed section stator vanes extending from the stator shroud casing into the compressor flow passage, a second leading edge plane being defined perpendicular to the compressor centerline axis at a leading edge of at least one of the plurality of the second bleed section stator vanes, (ii) a second compressor bleed air system including (1) a second compressor bleed air duct including an inlet end and an outlet end, the inlet end extending through the stator shroud casing and providing airflow communication between the compressor flow passage and the second compressor bleed air duct, and (2) a second sloped inlet portion in the stator shroud casing extending upstream from the inlet end of the second compressor bleed air duct to at least the second leading edge plane, the second sloped inlet portion expanding radially outward in the stator shroud casing from an upstream end of the second sloped inlet portion to the inlet end of the second compressor bleed air duct, the inlet end of the second compressor bleed air duct being arranged downstream of the plurality of second bleed section stator vanes.

The gas turbine engine according to any preceding clause, wherein the second sloped inlet portion comprising a second plurality of NACA submerged inlet portions.

The gas turbine engine according to any preceding clause, wherein the plurality of second bleed section stator vanes being circumferentially spaced about the stator shroud casing, and respective ones of the second plurality of NACA submerged inlet portions are circumferentially arranged between a respective pair of the plurality of second bleed section stator vanes.

A gas turbine engine comprises a compressor section including (a) a compressor rotor shaft assembly, and (b) a stator shroud casing surrounding the compressor rotor shaft assembly, a compressor flow passage being defined between the compressor rotor shaft assembly and the stator shroud casing, (c) a plurality of bleed section stator vanes extending into the compressor flow passage, and (d) a stator bleed air cavity arranged radially outward of the stator shroud casing, at least one of the plurality of bleed section stator vanes including a stator vane bleed airflow passage providing airflow communication between the compressor flow passage and the stator bleed air cavity, and a compressor bleed air system including (a) a compressor bleed air passage including an inlet end and an outlet end, the inlet end extending through the stator shroud casing and providing airflow communication between the compressor flow passage and the compressor bleed air passage, and (b) at least one bleed cavity airflow passage providing airflow communication between the stator bleed air cavity and the bleed air passage.

The gas turbine engine according to any preceding clause, wherein the at least one cavity airflow passage has a length L and a diameter D, and a ration L/D=1.0 to 5.0.

The gas turbine engine according to any preceding clause, wherein the at least one cavity airflow passage being arranged at an angle with respect to a centerline axis of the compressor section.

The gas turbine engine according to any preceding clause, wherein the stator bleed air cavity being arranged on an upstream side of the compressor bleed air passage, and the at least one cavity airflow passage is arranged through the upstream side of the compressor bleed air passage.

The gas turbine engine according to any preceding clause, wherein the at least one bleed section stator vane including a NACA inlet scoop extending through a side portion of the bleed section stator vane, the NACA inlet scoop being in airflow communication with the stator vane bleed airflow passage.

The gas turbine engine according to any preceding clause, wherein the NACA inlet scoop being arranged at a first distance from an outer end of the at least one bleed section stator vane, the first distance being a percentage of a span of the bleed section stator vane defined from the outer end to an inner end of the bleed section stator vane.

The gas turbine engine according to any preceding clause, wherein the percentage of the span of the bleed section stator vane having a range from twenty-five percent of the span of the bleed section stator vane to fifty percent of the span of the bleed section stator vane.

Although the foregoing description is directed to some exemplary embodiments of the present disclosure, other variations and modifications will be apparent to those skilled in the art, and may be made without departing from the spirit or the scope of the disclosure. Moreover, features described in connection with one embodiment of the present disclosure may be used in conjunction with other embodiments, even if not explicitly stated above.

We claim:

1. A gas turbine engine comprising:
   a compressor section including (a) a compressor rotor shaft assembly, (b) a stator shroud casing surrounding the compressor rotor shaft assembly, a compressor flow passage being defined between the compressor rotor shaft assembly and the stator shroud casing, and (c) a plurality of bleed section stator vanes extending from the stator shroud casing into the compressor flow passage, a leading edge plane being defined perpendicular to a compressor centerline axis at a leading edge of at least one of the plurality of bleed section stator vanes; and
   a compressor bleed air system including (a) a compressor bleed air duct including an inlet end and an outlet end, the inlet end extending through the stator shroud casing and providing airflow communication between the compressor flow passage and the compressor bleed air duct, and (b) a plurality of submerged sloped inlet portions in the stator shroud casing each extending upstream from the inlet end of the compressor bleed air duct to at least the leading edge plane, each of the plurality of submerged sloped inlet portions expanding radially outward in the stator shroud casing from an upstream end of the submerged sloped inlet portion to the inlet end of the compressor bleed air duct, the inlet end of the compressor bleed air duct being arranged downstream of the plurality of bleed section stator vanes,
   wherein the plurality of bleed section stator vanes are circumferentially spaced about the stator shroud casing, and respective ones of the plurality of submerged sloped inlet portions are circumferentially arranged between a respective pair of the plurality of bleed section stator vanes.

2. The gas turbine engine according to claim 1, wherein a trailing edge plane is defined at a trailing edge of at least one of the plurality of bleed section stator vanes, and the inlet end of the compressor bleed air duct is arranged downstream of the trailing edge plane.

3. The gas turbine engine according to claim 1, wherein the inlet end of the compressor bleed air duct is a curved duct having the inlet end and the outlet end, an upstream side of the inlet end of the curved duct being arranged at a first angle with respect the compressor centerline axis, and an upstream side of the outlet end of the curved duct being arranged at a second angle with respect to the compressor centerline axis.

4. The gas turbine engine according to claim 3, wherein each of the plurality of submerged sloped inlet portions is arranged at a third angle with respect to the compressor centerline axis.

5. The gas turbine engine according to claim 1, wherein the plurality of submerged sloped inlet portions comprises a plurality of NACA submerged inlet portions.

6. The gas turbine engine according to claim 5, wherein respective ones of the plurality of NACA submerged inlet portions are circumferentially arranged between the respective pair of the plurality of bleed section stator vanes.

7. The gas turbine engine according to claim 6, wherein each NACA submerged inlet portion includes a first end being longitudinally aligned with the leading edge plane.

8. The gas turbine engine according to claim 7, wherein each NACA submerged inlet portion has a diverging width extending in a downstream direction from the first end of the NACA submerged inlet portion.

9. The gas turbine engine according to claim 8, wherein each NACA submerged inlet portion includes a first sidewall and a second sidewall, the first sidewall and the second sidewall defining a wishbone shape in a plan view of the NACA submerged inlet portion.

10. The gas turbine engine according to claim 1, wherein the compressor bleed air system is arranged at a first stage of the compressor section, and the gas turbine engine further includes a second stage of the compressor section downstream of the first stage, the second stage including (i) a plurality of second bleed section stator vanes extending from the stator shroud casing into the compressor flow passage, a second leading edge plane being defined perpendicular to the compressor centerline axis at a leading edge of at least one of the plurality of the second bleed section stator vanes, (ii) a second compressor bleed air system including (1) a second compressor bleed air duct including an inlet end and an outlet end, the inlet end extending through the stator shroud casing and providing airflow communication between the compressor flow passage and the second compressor bleed air duct, and (2) a second sloped inlet portion in the stator shroud casing extending upstream from the inlet end of the second compressor bleed air duct to at least the second leading edge plane, the second sloped inlet portion expanding radially outward in the stator shroud casing from an upstream end of the second sloped inlet portion to the inlet end of the second compressor bleed air duct, the inlet end of the second compressor bleed air duct being arranged downstream of the plurality of second bleed section stator vanes.

11. The gas turbine engine according to claim 10, wherein the second sloped inlet portion comprises a second plurality of NACA submerged inlet portions.

12. The gas turbine engine according to claim 11, wherein the plurality of second bleed section stator vanes are circumferentially spaced about the stator shroud casing, and respective ones of the second plurality of NACA submerged inlet portions are circumferentially arranged between a respective pair of the plurality of second bleed section stator vanes.

13. A gas turbine engine comprising:
   a compressor section including (a) a compressor rotor shaft assembly, and (b) a stator shroud casing surrounding the compressor rotor shaft assembly, a compressor flow passage being defined between the compressor rotor shaft assembly and the stator shroud casing, (c) a plurality of bleed section stator vanes extending into the compressor flow passage, and (d) a stator bleed air cavity arranged radially outward of the stator shroud casing, at least one of the plurality of bleed section stator vanes including an inlet scoop extending through a side portion of the bleed section stator vane and a stator vane bleed airflow passage within the bleed section stator vane providing airflow communication between the compressor flow passage and the stator bleed air cavity; and a compressor bleed air system including (a) a compressor bleed air passage including an inlet end and an outlet end, the inlet end extending through the stator shroud casing and providing airflow communication between the compressor flow passage and the compressor bleed air passage, and (b) at least one bleed cavity airflow passage providing airflow communication between the stator bleed air cavity and the compressor bleed air passage.

14. The gas turbine engine according to claim 13, wherein the at least one bleed cavity airflow passage has a length L and a diameter D, and a ratio L/D=1.0 to 5.0.

15. The gas turbine engine according to claim 13, wherein the at least one bleed cavity airflow passage is arranged at an angle with respect to a centerline axis of the compressor section.

16. The gas turbine engine according to claim 13, wherein the stator bleed air cavity is arranged on an upstream side of the compressor bleed air passage, and the at least one bleed cavity airflow passage is arranged through the upstream side of the compressor bleed air passage.

17. The gas turbine engine according to claim 13, wherein the inlet scoop is a NACA inlet scoop extending through the side portion of the bleed section stator vane, the NACA inlet scoop being in airflow communication with the stator vane bleed airflow passage.

18. The gas turbine engine according to claim 17, wherein the NACA inlet scoop is arranged at a first distance from an outer end of the bleed section stator vane, the first distance being a percentage of a span of the bleed section stator vane defined from the outer end to an inner end of the bleed section stator vane.

19. The gas turbine engine according to claim 18, wherein the percentage of the span of the bleed section stator vane has a range from twenty-five percent of the span of the bleed section stator vane to fifty percent of the span of the bleed section stator vane.

\* \* \* \* \*